United States Patent [19]

Criste

[11] Patent Number: 4,846,360
[45] Date of Patent: Jul. 11, 1989

[54] REUSABLE BOTTLE CAP

[76] Inventor: Donald E. Criste, 6211 Blue Ridge Ave., Harrisburg, Pa. 17112

[21] Appl. No.: 241,709

[22] Filed: Sep. 8, 1988

[51] Int. Cl.[4] ............................................. B65D 51/24
[52] U.S. Cl. ....................................... 215/226; 81/3.4; 81/3.09
[58] Field of Search ................... 215/226, 228, 100 R; 81/3.4, 3.07, 3.09, 3.15

[56] References Cited

U.S. PATENT DOCUMENTS

| 959,220 | 5/1910 | Hoeft | 215/226 |
| 3,317,069 | 5/1967 | Chin | 215/353 |
| 3,402,844 | 9/1968 | Chin | 215/228 X |
| 4,101,044 | 7/1978 | Paquette et al. | 215/228 |
| 4,340,147 | 7/1982 | McIntosh | 215/226 |

FOREIGN PATENT DOCUMENTS 1551924 11/1968 France ..................... 81/3.09

Primary Examiner—Donald F. Norton
Attorney, Agent, or Firm—Bruce J. Wolstoncroft

[57] ABSTRACT

The invention is directed to a reusable bottle cap which cooperates with a soda bottle or the like to maintain the required pressure within the bottle. The reusable bottle cap is secured to an open end of the bottle. The bottle, with the bottle cap secured thereto, is inverted such that the liquid contents of the bottle is provided adjacent the bottle cap. In this position, air is prevent from flowing into or out of the bottle, so that the pressure of the bottle is maintained over time and changing conditions. Support means are provided on the bottle cap to insure that the bottle will be maintained in the vertical position. Also provided on the bottle cap is a removal means, which cooperates with the original lid of the bottle, to easily remove the lid therefrom.

12 Claims, 2 Drawing Sheets

REUSABLE BOTTLE CAP

FIELD OF THE INVENTION

The invention is directed to a bottle cap. In particular, the bottle cap cooperates with a soda bottle or the like to insure that the liquid remains carbonated over a long period of time.

BACKGROUND OF THE INVENTION

With the increasing popularity of reusable soda bottles and the like, it is important that the bottles be resealed after each use. Adequately resealing the bottle is essential to maintain the carbonation in the liquid. In order for this to occur, the cap must create an air tight seal with the bottle to maintain an increased pressure therein. In the alternative, if the pressure is allowed to escape between the cap and the bottle, the soda will loose its carbonation.

Various attempts have been made to provide a bottle cap which will maintain the increased pressure in the bottle. One such bottle cap, which is currently available, has a soft rubber or plastic liner provided inside an outer shell. The outer shell is dimensioned to fit over the threads of the bottle, while the liner cooperates with the threads. This cooperation of the liner with the threads provides a seal therebetween, thereby theoretically preventing the flow of air into and out of the bottle. The shell insures that the liner is protected and maintained in place. However, this type of cap has been proven inadequate. The liner must be comprised of material which is rigid enough to maintain a shape, while being resilient enough to deform about the threads of the bottle. As the liner is subject to the temperature changes, associated with being moved into and out of the refrigerator, the liner expands and contracts at a different rate than the bottle (due to the different materials). This causes passages to be provided between the threads and the liner, through which air can escape, thereby allowing the pressure to escape from the bottle. Another problem associated with bottles caps of the prior art, is that the liner has a tendency to deform with use. Consequently, the more the cap is used, the less effective the seal becomes. The deformation of the liner provides passages through which air can flow.

Another bottle cap which is available in the market has a shell which has cap threads provided to cooperate with the bottle threads. In order to provide an air tight seal, a thin layer of material, which is manufactured from rubber or soft plastic is positioned on an inside surface of the cap to cooperate with the top of the bottle. The same material also extends between the cap threads, such that as the cap is positioned on the bottle, the material between the cap threads will cooperate with the bottle threads to prevent the passage of air therebetween. However, this cap suffers from the same inadequacies as described above. However, the problem of an inadequate seal occurring is more pronounced in this cap. Due to the thin layer of material deforming after only a few cycles, the seal will fail.

It would therefore, be beneficial to provide a bottle cap which, under any conditions and over many cycle would prevent the flow of air from the bottle, thereby maintaining the required pressure in the bottle. In order to insure that this seal will remain stable over time and changing conditions, it would be beneficial to obtain this result without the use of a material which expands and contract at different rate as the bottle.

SUMMARY OF THE INVENTION

The invention is directed to a reusable bottle cap for use with a bottle having a liquid substance provided therein. The reusable bottle cap has a body portion with a first surface and a second surface. A removal means is provided proximate the first surface of the body portion. The removal means is provided to cooperate with an original lid of the bottle, to allow the original lid to be easily removed from the bottle.

Sealing means are provided proximate the second surface of the body portion. The sealing means cooperates with an open end of the bottle to prevent the flow of air into the bottle. Support means extends from the sealing means in a direction which is essentially perpendicular to the longitudinal axis of the sealing means.

When the bottle is in an inverted position, with the open end of the bottle inserted into the sealing means, the support means provides the support necessary to maintain the bottle in a vertical position. Maintaining the bottle in the vertical position insures that the substance of the bottle will be maintained in cooperation with the sealing means to prevent the flow of air out of the bottle.

DETAILED DESCRIPTION OF THE INVENTION

Figure 1:
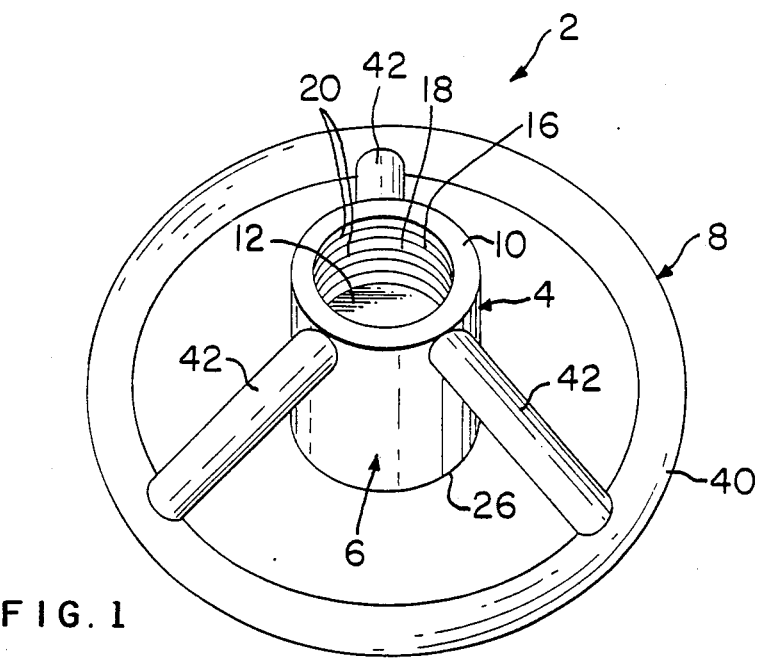
FIG. 1 is a perspective view of a reusable bottle cap of the present invention.

As shown in FIG. 1, a bottle, cap 2, made from plastic or any material having the strength characteristics required, has a sealing portion 4, a removal portion 6, and a support portion 8. The bottle cap is used to cooperate with a soda bottle or the like, to insure that the contents of the soda bottle remains carbonated over time. The bottle cap also provides the means to facilitate the removal of the original bottle cap which is provided on the bottle.

Figure 2:
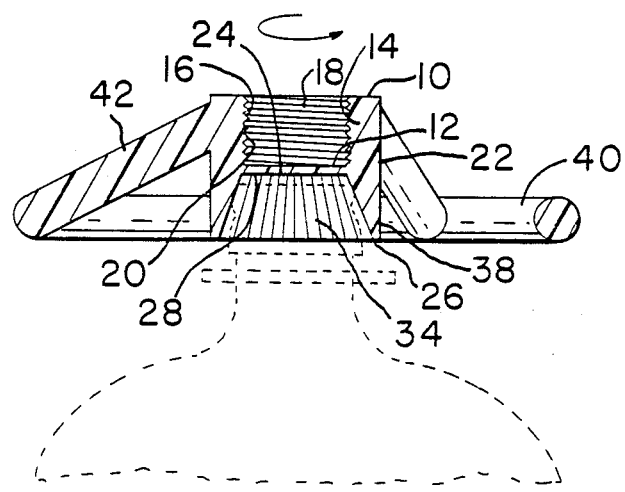
FIG. 2 is a cross-sectional view of the reusable bottle cap showing a bottle positioned in cooperation with a removal portion thereof.

As best shown in FIGS. 1 and 2, sealing portion 4 is a cylindrical member which extends from a first major surface 10 to a second surface 12. A side wall 14 extends from and integrally attaches the first major surface to the second surface. An inside surface 16 of side wall 14 defines an opening 18 which is provided in support portion 4. The opening has a diameter d. The diameter d is essentially equal to the diameter of an end of the bottle. Spiral threads 20 are provided on inside side surface 16, and extends inward toward the longitudinal axis of opening 18.

Outside side surface 22 is provided on side wall 14 opposite inside side surface 16. The outside side surface defines the outside of the cylinder, the diameter of which is D. It should be noted that the thickness of side wall 14 can vary according to the strength characteristics required.

Second surface 12 extends across opening 18 to provide an end wall for the opening. Second surface 12 is a surface of transition member 24 which separates sealing portion 4 from removal portion 6.

Figure 3:
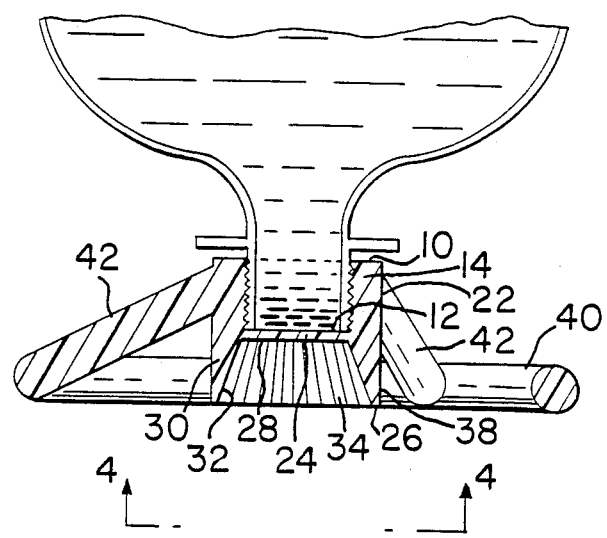
FIG. 3 is a cross-sectional view of the reusable bottle cap in the inverted position, showing a bottle positioned in cooperation with a sealing portion thereof.
Figure 4:
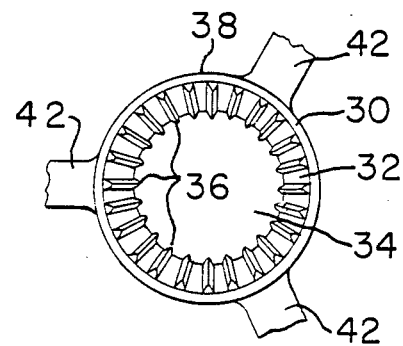
FIG. 4 is a partial bottom view of the reusable bottle cap showing ribs extending into an opening of the removal portion.

As best shown in FIGS. 3 and 4, removal portion 6 is essentially cylindrical in shape. The removal portion extends from a second major surface 26 to a first surface 28. An inside side surface 32 is side wall 30 defines an opening 34 which is provided in removal portion 6. The opening has a varied diameter. As shown in FIG. 3, the diameter of opening 34 is largest adjacent second major surface 26, and smallest adjacent first surface 28. Ribs 36 are provided on inside side surface 32. The ribs extend the length of opening 34 and are configured such that the ends of ribs 36 adjacent first surface 28 have a closer center line spacing than the ends of ribs 36 adjacent second major surface 26. As is shown in FIG. 4, ribs 36 extend from inside side surface 32 toward the longitudinal axis of opening 34.

Outside side surface 38 is provided on side wall 30 opposite inside side surface 32. The outside side surface defines the outside of the cylinder, the diameter of which is D. In the embodiment shown, outside side surface 38 is an extension of outside side surface 22, although this is not required.

First surface 28 extends across opening 34 to provide an end wall for the opening. First surface 28 is a surface of transition member 24. As is shown in Figures 2 and 3, second surface 12 is essentially parallel and opposed to first surface 28.

Referring to FIG. 1, support portion 8 has a circular member 40 which extends about removal portion 6. The center of circular member 40 is positioned on the longitudinal axis of cylindrical removal portion 6. In the embodiment shown, the circular member does not extend to outside side surface 38 of side wall 30, but rather member 40 has a thickness t. However, in the alternative, it is conceivable that member 40 will extend and integrally attach to outside side surface 38.

Connecting arms 42 extend from circular member 40 to sealing portion 4. As shown in FIGS. 1 through 3, connecting arms 42 are integrally attached to circular member 40 and to outside side surface 22 of sealing portion 4. The configuration of connecting arms 42 insures that circular member 40 will be provided in accurate position relative to sealing portion 4 and removal portion 6. It should be noted that although three connecting arms are shown in FIG. 1, any amount may be provided.

In operation, a soda bottle or the like is brought into engagement with removal portion 6 of cap 2. This is done prior to the first use of the bottle. As is shown in FIG. 2, the bottle with the original cap secured thereto is brought into alignment with removal portion 6. The original cap of the bottle is moved into opening 34. this motion is continued until the original cap cannot be moved any further into opening 34. At this point, the diameter of the original cap and the diameter of opening 34 are equal, as shown in FIG. 2. In this position, ribs 36 frictionally engage the original cap. Ribs 36 may also physically engage corresponding ribs provided on the original cap.

With ribs 36 positioned in engagement with the original cap of the bottle, cap 2 is rotated in the direction indicated by the arrow of FIG. 2. This motion causes the original cap to be unscrewed from the threads of the bottle. If the original cap is particularly difficult to remove, the user may grip cap 2 on the circular member 40 and turn. This gives the user an increased torque and the mechanical advantage to loosed the original cap. It should be noted that the material used to manufacture cap 2 has the strength characteristics required to withstand the forces associated with the removal of the original cap.

In order to reseal the bottle, after the original cap has been removed, cap 2 is moved into alignment with the top of the bottle. Cap 2 is positioned such that sealing portion 4 is provided adjacent the top of the bottle. The sealing portion 4 is then moved into engagement with the bottle. Cap 2 is rotated to allow threads 20 to cooperate with the threads of the bottle to secure cap 2 on the bottle.

With cap 2 tightened on the bottle, the bottle and cap 2 are inverted, as shown in FIG. 3. The bottle and cap assembly are then stored in this position. The span of circular member 40 is sufficient to allow the bottle and cap assembly to be supported thereby. In other words, when the assembly is provided in the refrigerator, cap 2 is placed on the shelf, such that member 40 and second major surface 26 of removal portion 6 engage the shelf. The diameter of member 40 is great enough to insure that the bottle and cap assembly will be maintained in the vertical position without the possibility of tipping over. The process is repeated after each use.

Storing the bottle in the position indicated in FIG. 3 causes the liquid contents of the bottle to flow to bottle cap 2 and the air provided in the bottle to move away from cap 2. The positioning of the liquid contents about the bottle cap 2 prevents the movement of air through the threaded portion. In other words the liquid contents of the bottle creates the seal about the end of the bottle. Consequently, as no air can escape or enter the bottle, the pressure and carbonation are maintained over a long period.

This invention does not suffer from the inherent defects found in the prior art. As no liners are required, there is no portion of the cap 2 which will fail from repeated use. Also, as no liners are needed, the change in temperatures, etc. will have no effect on the seal. In other words, the present invention utilizes the contents of the bottle to prevent the loss of pressure in the bottle, and consequently, prevents the loss of the carbonation of the contents. It is important to note, that as the contents are liquid, the contents will automatically fill air voids, even if the bottle expands at a different rate than cap 2. Therefore, no matter the conditions, the carbonation of the soft drink will be maintained.

Changes in construction will occur to those skilled in the art and various apparently different modifications and embodiments may be made without departing from the scope of the invention. The matter set forth in the foregoing description and accompanying drawings is offered by way of illustration only.

I claim:

1. A reusable bottle cap for use with a bottle having a substance contained therein, the reusable bottle cap comprising:
   a body portion having a first major surface and a second major surface;
   a means provided to cooperate with an original lid of the bottle, the means provided proximate the second major surface of the body portion, and having a first opening which as ribs provided on a side wall thereof, the ribs extend into the first opening to provide an increased frictional engagement between the side wall of the first opening and the original bottle lid, such that as the bottle cap is rotated, the original lid is rotated accordingly; and a sealing means provided proximate the first major surface of the body portion, the sealing means cooperates with an open end of the bottle to prevent the flow of air into the bottle.

2. A reusable bottle cap as recited in claim 1 wherein the body portion has a generally cylindrical configuration, the body portion having an outside side surface which extends from the first major surface to the second major surface.

3. A reusable bottle cap as recited in claim 2 wherein a second opening is provided in the sealing means, the opening extends from proximate the first major surface toward the second major surface, the diameter of the opening is essentially equal to the diameter of an end of the bottle with which the original bottle lid cooperates.

4. A reusable bottle cap as recited in claim 3 wherein threads are provided on a side wall of the second opening, the threads of the second opening cooperate with bottle threads provided on the end of the bottle to secure the reusable bottle cap to the bottle, whereby as the bottle and the reusable bottle cap are inverted, the substance provided in the bottle flows towards the reusable bottle cap such that the positioning of the substance adjacent the reusable bottle cap prevents the flow of air into the bottle.

5. A reusable bottle cap as recited in claim 1 wherein the first opening extends from proximate the second major surface toward the first major surface, the opening having a variable diameter, such that as the original bottle lid is inserted into the second opening, the side wall of the opening will frictionally engage the original bottle lid of the bottle.

6. A reusable bottle cap as recited in claim 1 wherein support means extend from the the body portion, the support means having an area large enough to support the bottle, whereby with the sealing means of the reusable bottle cap secured to the bottle, the reusable bottle cap and the bottle are inverted to provide the substance of the the bottle in cooperation with the sealing means to prevent the flow of air out of the bottle, the support means insures that the bottle will be maintained in the vertical position.

7. A reusable bottle cap for use with a bottle having a substance provided therein, the reusable bottle cap comprising:

a body portion having a first major surface and a second major surface;

removal means provided proximate the second major surface of the body portion, the removal means provided to cooperate with an original lid of the bottle, to allow the original lid to be easily removed from the bottle;

sealing means provided proximate the first major surface of the body portion, the sealing means cooperates with an open end of the bottle to prevent the flow of air into the bottle; and a support means extending from the sealing means in a direction which is essentially perpendicular to the longitudinal axis of the sealing means.

8. A reusable bottle cap as recited in claim 7 wherein the sealing means has an opening provided therein, the opening extends from the first major surface toward the second major surface, threads are provided in the opening, the threads provided to cooperate with an open end of the bottle.

9. A reusable bottle cap as recited in claim 8 wherein the support means has an area large enough to support the bottle, when the bottle is in an inverted position, wherein when the open end of the bottle is inserted into the opening of the sealing means, and the bottle and the reusable bottle cap are inverted, the support means provides the support necessary to maintain the bottle in a vertical position, thereby positioning the substance of the bottle in cooperation with the sealing means to prevent the flow of air out of the bottle.

10. A reusable bottle cap as recited in claim 7 wherein the removal means has an opening which is provided proximate the second major surface, and which extends toward the first major surface, the removal means cooperates with an original bottle lid positioned on the open end of the bottle.

11. A reusable bottle cap as recited in claim 1 wherein the second opening has a variable diameter, the diameter of the second opening being largest proximate the second major surface, the variable diameter provides the means to allow the original bottle lid to be inserted into the second opening until the original bottle lid engages a side wall of the opening, thereby providing a frictional engagement between the side wall of the opening and the original bottle lid.

12. A reusable bottle cap as recited in claim 11 wherein the second opening has ribs provided on the side wall, the ribs extend into the second opening to provide an increased frictional engagement between the side wall of the second opening and the original bottle lid, such that as the bottle cap is rotated, the original bottle lid is rotated accordingly.

* * * * *